(12) United States Patent
Bodnar et al.

(10) Patent No.: US 6,324,176 B1
(45) Date of Patent: Nov. 27, 2001

(54) SWITCHING INTERNET TRAFFIC THROUGH DIGITAL SWITCHES HAVING A TIME SLOT INTERCHANGE NETWORK

(75) Inventors: Bohdan Lew Bodnar, Park Ridge; James Patrick Dunn, Northfield Township, LaSalle County; Conrad Martin Herse; Enn Tammaru, both of Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/092,666

(22) Filed: Jun. 5, 1998

(51) Int. Cl.[7] .................................................. H04Q 11/04
(52) U.S. Cl. ........................................ 370/376; 370/424
(58) Field of Search ................................... 370/360, 369, 370/370, 371, 372, 373, 374, 375, 376, 377, 378, 379, 389, 392, 422, 423, 428, 429, 458, 474, 395, 424, 352

(56) References Cited

U.S. PATENT DOCUMENTS 6,101,187 * 8/2000 Cukier et al. ........................ 370/396

FOREIGN PATENT DOCUMENTS

0836353A2   8/1997 (EP) .............................. H04Q/11/04

* cited by examiner

Primary Examiner—Kwang B. Yao
(74) Attorney, Agent, or Firm—Werner Ulrich

(57) ABSTRACT

Apparatus and a method for interfacing between the Internet and the Telephone Network. A time slot interchange is enhanced by the addition of a supplementary memory for storing data for accumulating Internet packets. When a packet has been accumulated, the appropriate header is inserted into the packet under the control of a routing processor, and the packet can then be sent as a group of adjacent PCM samples over a connection to the Internet. In other embodiments, information is sent to the Internet over a direct data pipe for transmitting ATM cells or Ethernet packets. A Vocoder signal processor can be inserted between the TSI memory, and the supplementary memory to convert PCM voice samples into vocoded voice samples for transmission over the Internet. A modem signal processor can be interposed between the TSI memory and the supplementary memory to convert between analog data (representing for example, shift key analog signals) and binary data for transmission within packets over the Internet. Advantageously, existing TSI units can be used to interface with both the telephone plant and the Internet.

10 Claims, 4 Drawing Sheets

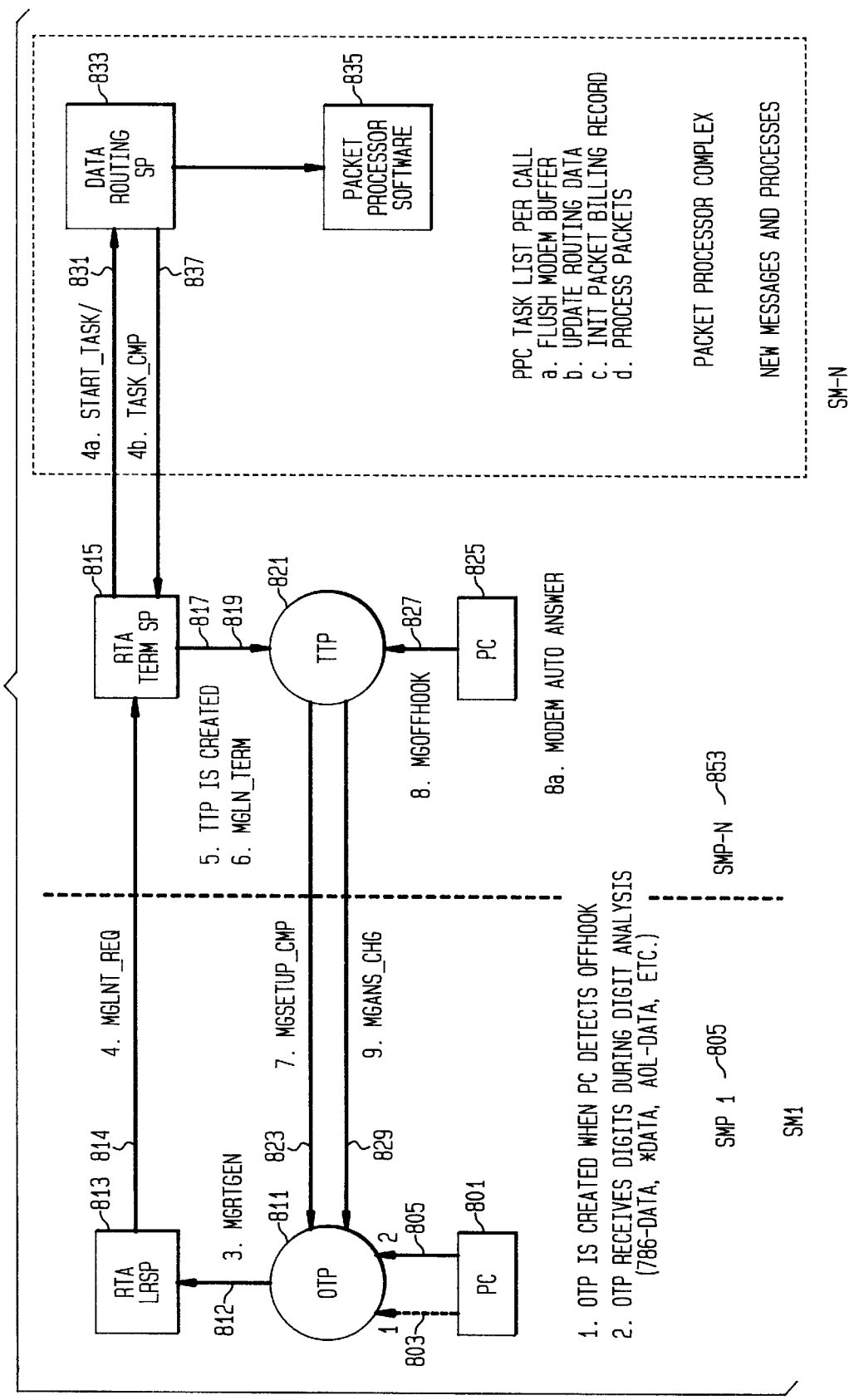

US 6,324,176 B1

SWITCHING INTERNET TRAFFIC THROUGH DIGITAL SWITCHES HAVING A TIME SLOT INTERCHANGE NETWORK

TECHNICAL FIELD

This invention relates to the switching of connectionless data traffic through digital switches of the type used for switching voice traffic.

Problem:

In recent years, the volume of Internet traffic has grown tremendously. Much of this traffic originates, is switched through, or terminates in a telephone switching system having a digital time slot interchange switching network. These switches which are now pervasive through the modern public switched telephone network were designed initially to handle voice and circuit switched data traffic. Subsequently, many of these switches were adapted to handle integrated switched digital network (ISDN) traffic which combines switched voice, circuit switched data traffic, and some (D-channel) data switched data traffic. At this point, these switches are being adapted to handle data traffic required for serving Internet customers, traffic which when it enters the Internet backbone network, becomes connectionless.

The arrangements available in the prior art for serving connectionless traffic in telephone type switching systems are not efficient. One such arrangement uses an adjunct processor connected from and to a time slot interchange (TSI) network via trunk circuits of the type used for communicating with distant switching systems. This arrangement is expensive in its use of time slots and requires a large amount of memory in addition to the memory provided within the TSI.

In the prior art, connections through a telephone access switch are made directly to the Internet backbone network; this ties up a trunk to the Internet network for the duration of an Internet call.

Another alternative is to use the type of packet switch unit added to digital switches in order to process the relatively small amount of data switched traffic of ISDN lines. Such units have inadequate capacity, and also require the use of extra time slots and extra memory in addition to the TSI memory. A first problem with the prior art, therefore, is that there is no efficient way of handling the connectionless data traffic of Internet type data traffic.

Solution:

The above problem is solved, and an advance is made over the prior art in accordance with our invention wherein a processor means is directly tied to the memory of a TSI. This processor accumulates and transmits packets in a packet assembler-disassembler, and inserts output packets into an output buffer. In one embodiment of the Applicants' invention, the processor inserts output packets into a loopback buffer (normally used to write diagnostic patterns into the TSI memory); this processor, advantageously can access all time slots of the TSI since this is a fundamental characteristic of the TSI. The processor provides a centralized location for rate adaptation to allow slow rate Internet traffic to be adapted to fast rate transmission. The operations and maintenance (OA&M) arrangements for the processor can be readily combined with the OA&M arrangements of the switch. The higher reliability of a telephone switch can be used advantageously to provide similar high reliability for this Internet type traffic. The processor can readily access the subscriber data base, translations, and the subscriber line signaling information received in the switch.

In accordance with one preferred embodiment of the Applicants' invention, a digital signal processor in the TSI is used to modulate/demodulate PCM signals generated using analog lines and modems prior to being accumulated in the packet assembler-disassembler. Advantageously, this eliminates the need for external modems, that require extra time slots, to condition the PCM signals. In accordance with Applicant's preferred embodiment, the routing processor has access to all egress links via the loopback buffer access to all memories of the TSI. Advantageously, the processor may be connected to any idle time slot.

In a second embodiment of the Applicants' invention, the processor may be directly connected to data interfaces such as an ATM data interface that can be readily added to the TSI. In this embodiment, the Internet traffic is transmitted over a data network as a plurality of ATM cells.

In accordance with a third embodiment of the Applicants' invention, the processor may be directly connected to an LAN Interface such as Ethernet that could be readily added to the TSI. In this embodiment, the Internet traffic is transmitted directly to resident server advantageously providing Intranet capabilities for subscribers.

BRIEF DESCRIPTION OF THE DRAWING

FIG. 4 is a block diagram illustrating the steps for establishing connections between two PC's (Personal Computers) via the system shown in FIGS. 2 and 3.

DETAILED DESCRIPTION

Figure 1:
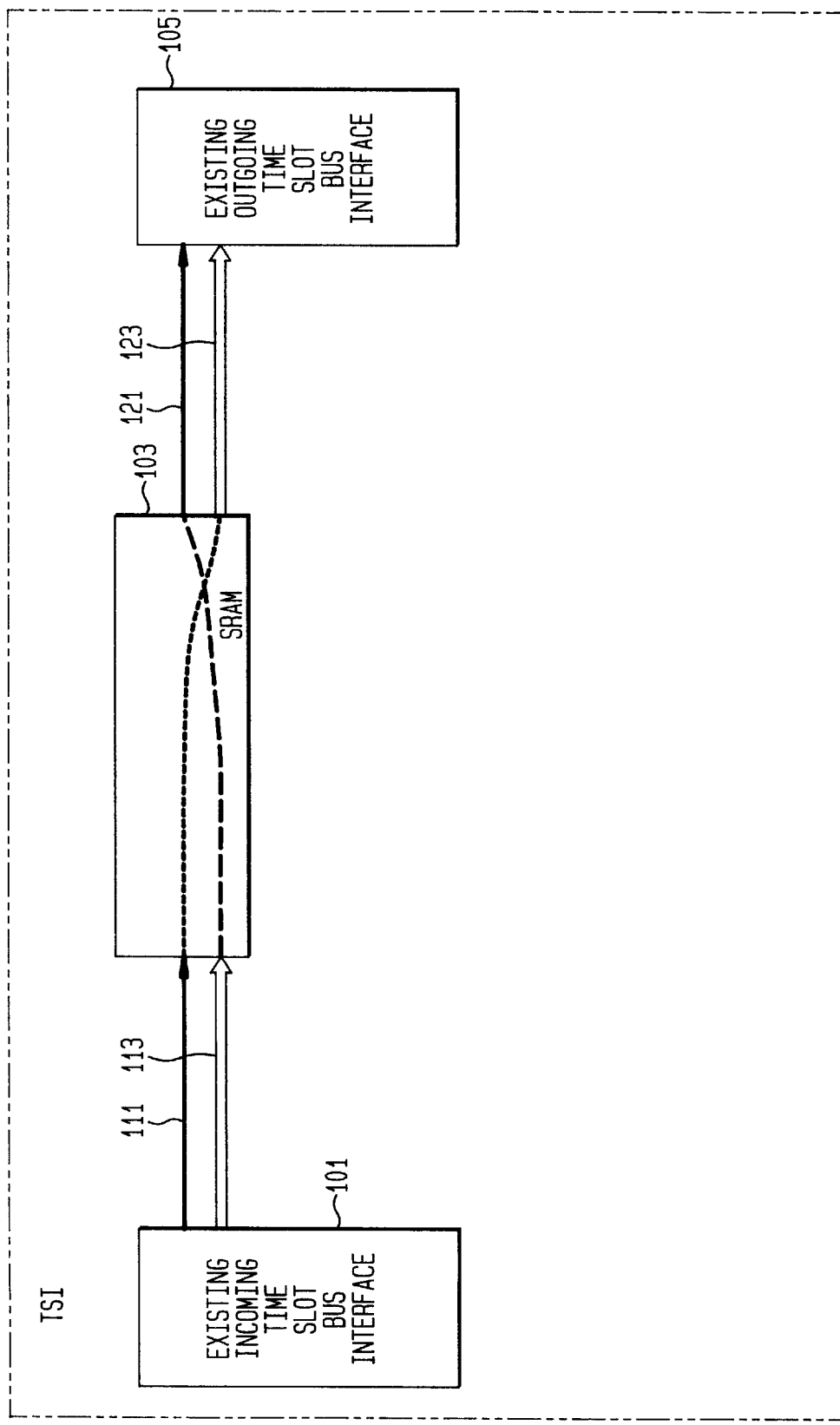
FIG. 1 is a diagram of a prior art time slot interchange and interface circuits.

FIG. 1 is from the prior art, and shows in simplified form how a time slot interchange works to switch, for example, telephone traffic. An existing time slot bus interface 101 interfaces with various line unit and trunk unit circuits which provide multiplexed pulse code modulation (PCM) input signals. The signals are placed in input line time slots 111 and input trunk time slots 113, and are stored in a static random access memory (SRAM) 103. The contents of the SRAM are sent to outgoing line time slots 121, and outgoing trunk time slots 123 to an existing outgoing time slot bus interface 105 for interfacing with the outgoing side of line and trunk units. It is to be understood that any time slot can be used for a line signal or for a trunk signal in terms of the basic operation of the TSI.

Figure 2:
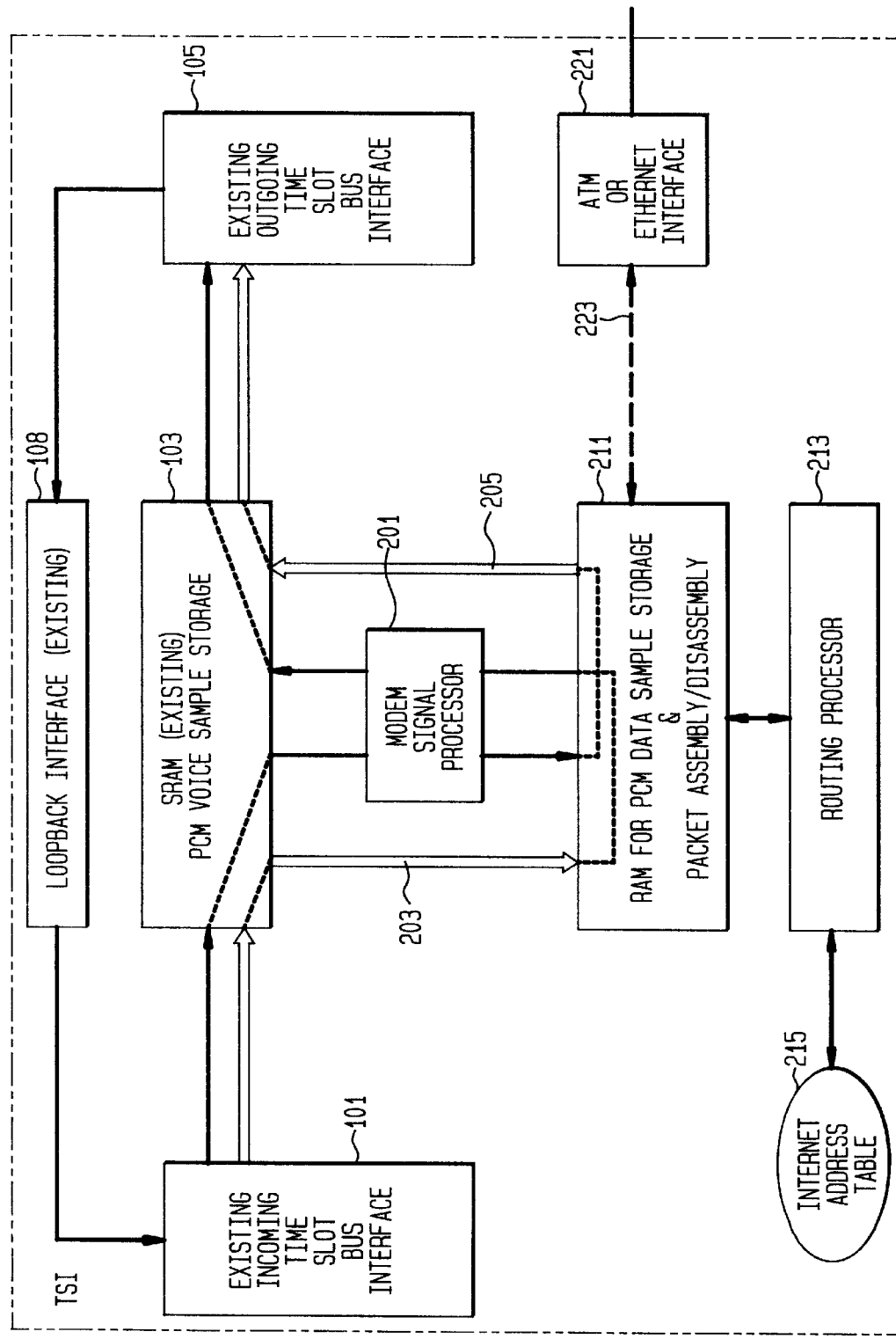
FIGS. 2 and 3 are block diagrams of preferred embodiments of Applicants' invention for interfacing between the telephone plant and the Internet or other data network.

FIG. 2 shows the enhancements of FIG. 1 necessary to implement Applicant' invention. The trunk time slots are sent as signals 203 directly to a RAM 211 for storing PCM signals and assembling and disassembling packets. Line time slots are sent to a modem signal processor 201 which converts analog PCM data to pure digital data for use by unit 211. The modem signal processor 201 also converts pure digital data from unit 211 into analog PCM type data for transmission to line e time slots 121. The assembled or disassembled packet in RAM 211 is modified by routing processor 213 to have the correct data address. The routing processor 213 then loads the packet into the TSI outgoing Interface 105. In performing its routing, the routing processor consults an Internet address table 215. The Internet address table is populated and entries are cleared from that table in accordance with the well-known teaching of the prior art.

In the second embodiment, the packets a re loaded or unloaded from an ATM Interface 221 over a packet data pipe 223 instead of the trunk time slots. In the third embodiment, that can provide Intranet services, the packets are loaded or are unloaded from an Ethernet interface 221 instead of the trunk timeslots. Just as any time slot in the existing TSI can communicate with any other time slot, in this embodiment, any packet, ATM cell or time slot can communicate with any other packet, ATM cell or time slot. The ATM interface can be used for interfacing directly with an ATM network. The Ethernet interface can be used for communicating with a data server (e.g., data base, Gateway router, proxy server, or traffic measurements analyzer), and can be used for interfacing with another routing processor that is co-located in the same switch.

In order to send a data stream to a selected time slot of an outgoing time slot interface 105 of a different slice of the TSI unit, the data stream is sent from interface 105 to the loopback interface 108 and thence to the incoming time slot bus interface 101. Inputs to interface 101 are automatically broadcast to all the SRAM units of the other slices of the TSI unit, from which the data stream can be sent to the selected time slot. In the prior art, the loopback interface 108 is only used as a diagnostic tool. Advantageously, this provides an inexpensive arrangement for accessing outgoing time slots of slices not equipped with a packet assembly/disassembly unit and routing processor, from a slice that is so equipped.

Figure 3:
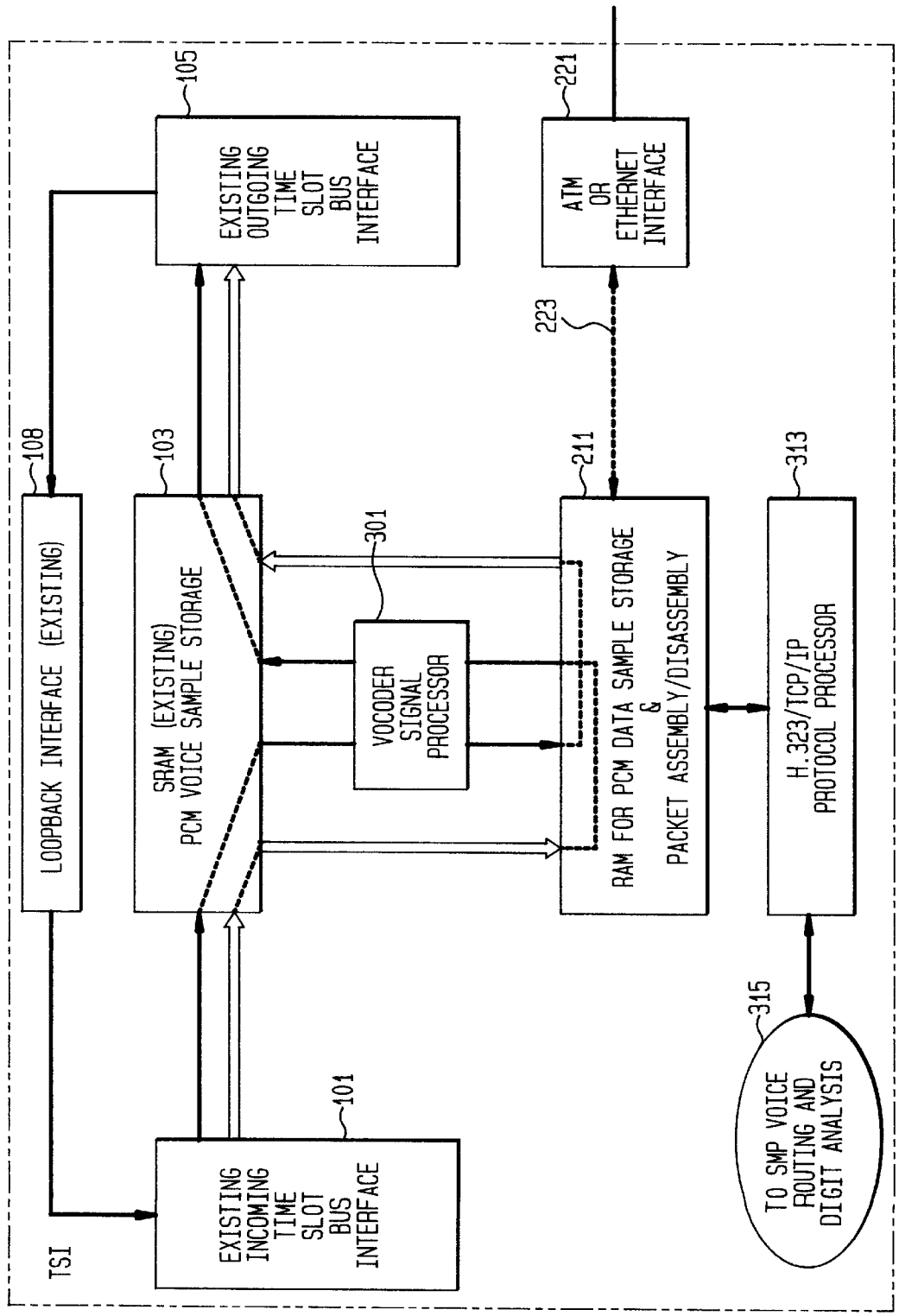

FIG. 3 illustrates routing voice traffic over an Internet network. The modem signal processor 201 is replaced by a vocoder signal processor 301 so that PCM voice can be converted into packetized voice which is a much more efficient way of carrying voice signals. The routing processor now processes the H.321 and TCP/IP protocol information; this processing encompasses call setup and teardown, datagram routing, and call control. The routing that is required is telephony routing rather than Internet routing, and this is accomplished by having the protocol processor 313 communicate with a switching module processor 315 for the purposes of digit analysis and routing of voice signals; the SMP 315 determines the destination address of the deactivation vocoder, and informs the routing processor of this address. The routing processor ensures that datagrams leaving that vocoder will be route d to the appropriate destination.

FIG. 4 is a diagram illustrating the process of setting up a call. Rectangles are system processes i.e., processes which are active as long as the switch is active, whereas circles are terminal processes which are created and live only for the duration of the call. The process is started when a peripheral control process 801 in Switching Module Processor (SMP) 1 (851), the SMP for serving the originating line, detects an off-hook signal from the caller. It sends a message 803, to create an originating terminal process 811. It subsequently sends additional messages 805 representing digits dialed or Internet addresses keyed by the caller. These are transmitted in messages 805. The originating terminal process 811 then requests a routing and terminal allocation—local routing system process 813 to route the call. Process 813 sends a line e terminating request 814 to a routing and terminal allocation—terminating system process 815 in SMP-N 853, the SMP which serves the called customer.

Process 815 then sends a message 817 to create a terminating terminal process 821, and sends to that process an identification of the terminating line 819. The terminating terminal process 821 instructs (via a function call) the peripheral control 825 to alert the terminating terminal. Terminating terminal process 821 sends a message 823 to originating terminal process 811 after peripheral control 825 completes the connection to indicate that the set-up has been completed. The terminating terminal automatically answers the call, and peripheral control 825 detects this answer and sends a message 827 to the terminating terminal process 821 verifying this answer. In response to receipt of the off-hook message from peripheral control 825, terminating terminal process 821 sends an answer message 829 to the originating terminal process.

All of the above call processing is generally performed, as in the prior art, as implemented for example on Lucent Technologies Inc.'s, 5 ESS® switch. The newly added elements Blocks 833 and 835 reside in the packet processor complex 211 of Applicant' invention. For Internet data or telephony calls, RTA terminating system process 815 sends a start task message 831 to a data routing system process 833 of the packet processor complex. This process interfaces with packet processing software to control the actions of the peripheral control process 835. The packet processor hardware complex processes any information in a modem buffer for interfacing with a modem signal processor 201 (FIG. 2), updates routing data, initiates packet billing measurement task to control the total number of packets in a call. After the packet processor complex has completed its setup task, it sends a task complete message 837 to the routing and terminal allocation terminating system process 815 to cut through the call paths. The packet processor complex then processes packets, as described earlier, for the duration of the call. The call is torn down when the line or trunk hangs up (disconnects). The per call resources (OTP 811, TTP 821 and PPC 835 tasks) are released and can then be reallocated to another call.

The above description is of one preferred embodiment. Many other embodiments will be apparent to those of ordinary skill in the art, without departing from the scope of the invention. The invention is only limited by the attached claims.

What is claimed is:

1. Apparatus for performing a digital switching function comprising:
   a time slot interchange interface, comprising:
       an incoming time slot bus interface;
       a memory for storing PCM samples from said incoming time slot bus interface; and
       an outgoing time slot bus interface for receiving samples stored in said memory;
   characterized in that:
       said apparatus further comprises another memory for storing incoming PCM samples for performing a packet assembly-disassembly function and for transmitting output data samples to said memory; and
       a routing processor for controlling said another memory and packet assembler-disassembler wherein packetized traffic received from said incoming time slot bus interface via said memory are assembled into packets provided with a proper header by said routing processor for transmission via said memory to said outgoing time slot bus interface;
   wherein said time-slot interchange interface memory for storing PCM samples and outgoing interface are on one slice of said time slot interchange (TSI) unit, and further comprising:
       a loopback interface for broadcasting selected outgoing time slots of active communications to memories of other slices of said TSI unit.

2. The apparatus of claim 1 further comprising:
   a modem signal processor for converting between analog digital signals and binary signals received from and transmitted to said memory;

said modem signal processor connected to said another memory for storing said binary signals into said memory.

3. The apparatus of claims 1 or 2 wherein said another memory is connected via a data packet pipe to a data network.

4. The apparatus of claim 3 wherein said data network is an asynchronous transfer mode (ATM) network.

5. The apparatus of claim 3 wherein said another memory is connected via a data packet pipe to an Ethernet interface for communicating with another server colocated with said apparatus.

6. The apparatus of claims 1 or 2 further comprising an Internet address table wherein said routing processor uses information from said Internet address table to formulate packet headers for packets assembled in said another memory.

7. The apparatus of claim 1 further comprising a Vocoder signal processor for accepting PCM voice samples from said memory for storage as vocoded voice signals in said another memory wherein ones of voice channels received from said incoming time slot interface are transmitted as vocoded data samples to said outgoing time slot bus interface.

8. The apparatus of claim 2 wherein said modem signal processor is further utilized for rate conversion, by storing input binary signals at a different rate than the rate of converting said stored signals into modem outputs.

9. Apparatus for performing a digital switching function comprising:
- a time slot interchange interface, comprising:
  - an incoming time slot bus interface;
  - a memory for storing PCM samples from said incoming time slot bus interface; and
  - an outgoing time slot bus interface for receiving samples stored in said memory;
- characterized in that:
  - said apparatus further comprises another memory for storing incoming PCM samples for performing a packet assembly-disassembly function and for transmitting output data samples to said memory; and
  - a routing processor for controlling said another memory and packet assembler-disassembler wherein packetized traffic received from said incoming time slot bus interface via said memory are assembled into packets provided with a proper header by said routing processor for transmission via said memory to said outgoing time slot bus interface;

wherein said time-slot interchange interface memory for storing PCM samples and outgoing interface are on one slice of said time slot interchange (TSI) unit and further comprising:
- a loopback interface for broadcasting selected outgoing time slots of active communications to memories of other slices of said TSI unit;

processor means for controlling establishment of an Internet connection;

said processor means operative under program control for controlling execution of the following steps:
- responsive to receipt of telephone number digits representing an Internet call establishing an originating terminal process;
- said original terminating process establishing a RTA (routing and terminal allocation) of LRSP, (local routing system process);
- said RTA/LRSP sending an internal system message to create an RTA terminal system process; said RTA terminal system process initiating a data routing system process in a packet processor complex;
- said RTA terminal system process creating a terminating terminal process at another half call end of said connection;
- said terminating PC transmitting an off-hook message to said terminating terminal process; and
- said terminating terminal process transmitting a message confirming establishment of the connection to said originating termi-nal process.

10. The apparatus of claim 9, further comprising:
- a modem signal processor for converting between analog digital signals and binary signals received from and transmitted to said memory;
- said modem signal processor connected to said another memory for storing said binary signals into said memory.

* * * * *